(12) United States Patent
Mutikainen et al.

(10) Patent No.: US 8,719,342 B2
(45) Date of Patent: May 6, 2014

(54) THIRD-PARTY SESSION MODIFICATION

(75) Inventors: Jari Mutikainen, Lepsämä (FI); Arto Leppisaari, Kangasala (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 640 days.

(21) Appl. No.: 11/485,391

(22) Filed: Jul. 13, 2006

(65) Prior Publication Data

US 2007/0250569 A1  Oct. 25, 2007

(30) Foreign Application Priority Data

Apr. 25, 2006  (EP) .................................. 06 008 556

(51) Int. Cl.
*G06F 15/16* (2006.01)
*H04L 12/16* (2006.01)

(52) U.S. Cl.
USPC .......................................... 709/204; 370/260

(58) Field of Classification Search
USPC ............... 370/395.2, 235, 352, 260; 709/246, 709/204; 379/202.1, 202.01
See application file for complete search history.

(56) References Cited

U.S. PATENT DOCUMENTS

| | | | |
|---|---|---|---|
| 7,027,577 B2* | 4/2006 | Gourraud et al. | 379/202.01 |
| 7,085,244 B2* | 8/2006 | Koskelainen et al. | 370/261 |
| 7,362,349 B2* | 4/2008 | Nelson et al. | 348/14.08 |
| 7,376,129 B2* | 5/2008 | Acharya et al. | 370/352 |
| 7,586,903 B2* | 9/2009 | Song et al. | 370/352 |
| 7,796,603 B1* | 9/2010 | Bertone et al. | 370/395.2 |
| 2003/0112947 A1* | 6/2003 | Cohen | 379/202.01 |
| 2003/0126211 A1* | 7/2003 | Anttila et al. | 709/205 |
| 2003/0187944 A1* | 10/2003 | Johnson et al. | 709/209 |
| 2004/0008635 A1* | 1/2004 | Nelson et al. | 370/260 |
| 2004/0095938 A1* | 5/2004 | Ryu | 370/392 |
| 2004/0174830 A1* | 9/2004 | Koskelainen et al. | 370/260 |
| 2004/0190453 A1* | 9/2004 | Rasanen et al. | 370/235 |
| 2005/0002405 A1* | 1/2005 | Gao | 370/401 |
| 2005/0058125 A1* | 3/2005 | Mutikainen et al. | 370/354 |
| 2005/0094621 A1* | 5/2005 | Acharya et al. | 370/352 |
| 2005/0278424 A1* | 12/2005 | White | 709/204 |
| 2006/0083244 A1* | 4/2006 | Jagadesan et al. | 370/395.2 |
| 2006/0092970 A1* | 5/2006 | Song et al. | 370/466 |
| 2007/0005804 A1* | 1/2007 | Rideout | 709/246 |
| 2007/0266075 A1* | 11/2007 | Jachner | 709/203 |
| 2008/0039029 A1* | 2/2008 | Dostal et al. | 455/90.2 |

OTHER PUBLICATIONS

Hans-Peter Dommel and J.J. Garcia-Luna-Aceves, Floor Control for Multimedia Conferencing and Collaboration, Jan. 1997, Springer Berlin/Heidelberg, Multimedia Systems journal, vol. 5, No. 1.*

(Continued)

*Primary Examiner* — Brian P. Whipple
*Assistant Examiner* — Michael A Chambers (57) ABSTRACT

The present invention relates to a method, system, client device, conference server device and computer program product of controlling media composition in a multi-party conversation involving a central control point (50). At a participant (10) of said multi-party conversation, a scope information (SoM) which specifies members of said multi-party conversation is selected and added to a session modifying request. The session modifying request is transmitted to the central control point (50) which initiates a media modification at the specified members in response to the scope information (SoM). Thereby, a client can control whether media modification is applied to the whole conference, selected participants or only between the client itself and the conference server.

54 Claims, 3 Drawing Sheets

(56) References Cited

OTHER PUBLICATIONS

European Office Action for corresponding EP Application No. 07 734 382.0-1244, Aug. 11, 2009, Europe.
Handley, M., Jacobson, V.: SDP: Session Description Protocol. The Internet Society, Apr. 1998, pp. 1-40.
Johnston, A., et al.: Session Initiation Protocol (SIP) Call Control—Conferencing for User Agents. The Internet Society, Aug. 2006, pp. 1-41.
Rosenberg, J., Schulzrinne, H.: An Offer/Answer Model with the Session Description Protocol (SDP). The Internet Society, Jun. 2002, pp. 1-24.
Rosenberg, J.: The Session Initiation Protocol (SIP) Update Method. The Internet Society, Sep. 2002, pp. 1-13.
European Office Action for corresponding EP Application No. 07 734 382.0-1244, Dec. 23, 2010, Europe, pp. 1-5.
International Preliminary Report on Patentability for International application No. PCT/IB2007/001064 dated Oct. 28, 2008, pp. 1-7.
International Search Report and Written Opinion for International application No. PCT/IB2007/001064 dated Sep. 13, 2007, pp. 1-9.
Response to EP Office Action dated Dec. 21, 2009 for counterpart EP Application No. 07734382.0, pp. 1-10.
Response to EP Office Action dated Jun. 21, 2011 for counterpart EP Application No. 07734382.0, pp. 1-12.
Summons to Oral Proceedings dated Feb. 17, 2012 for counterpart EP Application No. 07734382.0, pp. 1-7.
Response to Summons to Oral Proceedings dated Apr. 4, 2012 for counterpart EP Application No. 07734382.0, pp. 1-23.
Response to Summons to Oral Proceedings dated Apr. 25, 2012 for counterpart EP Application No. 07734382.0, pp. 1-7.
EP Office Action dated Apr. 26, 2012 for counterpart EP Application No. 07734382.0, pp. 1-3.

* cited by examiner

```
INVITE sip:session123@example.com SIP/2.0
   To: <sip:session123@example.com>
   From: <sip:PoC-userA@example.com>

Content-type: application/sdp
      m=message portUE-A TCP/MSRP*
        a=accept-types: image/jpg, file/zip
        a=path:msrp://IPaddressUE-A:portUE-A/random_A_id;tcp Content-type: application/resource-lists+xml
     <resource-lists xmlns="urn:ietf:params:xml:ns:resource-lists"
        xmlns:xsi="http://www.w3.org/2001/XMLSchema-instance">
         <list>
         <entry uri="sip:PoC-UserB@networkB.com" />
                 <entry uri="sip:PoC-UserC@networkC.com" />
                 <entry uri="sip:PoC-UserD@networkD.com" />
         </list>
     </resource-lists>
```

Fig. 3

```
m=message portUE-A TCP/MSRP*
a=accept-types: image/jpg, file/zip
a=path:msrp://IPaddressUE-A:portUE-A/random_A_id;tcp
a=conference
```

Fig. 4

```
REFER sip:focus123@example.com SIP/2.0
    To: <sip:focus123@example.com>
    From: <sip:user_a@example.com>
    Alternates: <sip:focus123@example.com>
    Refer-To: <sip:focus@example.com;audio;method=INVITE>
```

Fig. 5

REFER sip:focus123@example.com SIP/2.0
   To: <sip:focus123@example.com>
   From: <sip:user_a@example.com>
   Refer-To:<sip:focus@example.com;method=REFER
     ?Alternates: <sip:focus123@example.com>
      ?Refer-To="<sip:focus@example.com;audio;method=INVITE>

Fig. 6

THIRD-PARTY SESSION MODIFICATION

FIELD OF THE INVENTION

The present invention relates to a method, system, client device, conference server and computer-readable storage medium for controlling media composition in a multi-party conversation. According to a specific example, the present invention relates to media modification in a Session Initiation Protocol (SIP) conferencing framework.

BACKGROUND OF THE INVENTION

The SIP conferencing framework (as defined in draft-ieff-sipping-conferencing-framework-05.txt) defines basic procedures, functionalities and architecture how participants may create and join a SIP multimedia conference session, invite other participants to the session, remove participants from the session, become aware of other participants in the session, and so on. The conferencing framework has been then adopted to many SIP based conferencing standards, like 3GPP R6 IMS ($3^{rd}$ Generation Partnership Project Release 6 Internet Protocol (IP) Multimedia Subsystem) conferencing service (as specified e.g. in TS 24.147), OMA-PoC (Open Mobile Alliance—Push-to-talk over Cellular), and OMA-IM (Open Mobile Alliance—Instant Messaging).

The above framework describes how a SDP (Service Description Protocol) offer/answer mechanism specified in the IETF (Internet Engineering Task Force) specification RFC (Request for Comments) 3264 can be used to add, remove and modify media streams and their attributes in the multimedia conferencing session.

In a Multimedia conference session a user should be able to start the session with one particular media (e.g. PoC audio, IM, full-duplex audio, full-duplex video, etc) and add another media later on. The conferencing control function should then communicate the added media to other participants in the conference session, e.g., via an SDP offer in a SIP re-INVITE or a SIP UPDATE request which are described in the IETF RFC 3311. In this way the other participants learn that a new media has been added and they can start to use it in the session.

On the other hand, the same SDP offer/answer mechanism can be used also by a participant to modify the connection portion, i.e., call leg, between this participant and the central control point (e.g., focus in SIP conferencing terminology) of the conference, only. In this kind of session modification of the SIP conferencing framework, the focus should not modify the other participant's media sessions. For example, in the SIP conferencing framework, if one participant wants to put the full duplex audio media on hold, this is done by SDP offer/answer in re-INVITE/200 OK between this participant and the focus, but the focus should not send re-INVITE to other participants, since they are not put on hold and should thus be able to continue communicating as before.

Thus, the central control point needs to be able to determine, what SDP offers should be communicated to other participants and what are kept between a requesting participant and the focus only. In some media modifications, the central control point can determine this based on the SDP offer attributes. For example, if one participant puts the media in a conference session to "on hold", typically the central control point should not put the other participants to hold, but instead keep the media modification within this particular SIP dialog, i.e. between the participant and the focus. But with some SDP offers the central control point has no means to know whether the media modification should be sent further.

For example, if the conferencing session includes audio and video media and some participant wants to remove the video from his/her leg only (e.g. moves to a cell which cannot offer enough bandwidth for video), but the other participants do not have this limitation, i.e., they would like to continue with both audio and video.

The current SDP offer/answer mechanism in SIP conferencing framework is not enough to distinguish whether the media manipulation should be limited to one call leg or communicated to all participants. IETF XCON is solving a similar use case at the moment. There, a framework for media control protocol is defined, which a participant can use to control the media policies of the other participants, e.g. remove video from certain participant, mute one participant (remove the audio sending capability) and so on. However, the XCON work has been very slow, and the result anyhow will be a new protocol between the participant and the focus.

What OMA-IM and OMA-POC would need is a simple SIP based solution for adding and removing media, from standardization time schedule point of view, the IM and POC are not able to wait results from XCON, and they don't need the complex XCON framework and the other more advanced capabilities of the media policy control protocol.

SUMMARY OF THE INVENTION

It is therefore an object of the present invention to provide a simple session manipulation scheme by means of which media components can be added and removed in a simple and flexible manner.

This object is achieved by a method of controlling media composition in a multi-party conversation involving a central control point, said method comprising the steps of:
- selecting at a participant of said multi-party conversation a scope information which specifies members of said multi-party conversation;
- adding said selected scope information to a session modifying request;
- transmitting said session modifying request to said central control point; and
- initiating a media modification at said specified members in response to said scope information.

Furthermore, the above object is achieved by a client device for controlling media composition in a multi-party conversation involving a central control point, said client device comprising:
- selecting means for selecting a scope information which specifies members of said multi-party conversation;
- adding means for adding said selected scope information to a session modifying request; and
- transmitting means for transmitting said session modifying request to said central control point.

Additionally, the above object is achieved by a conference server device for providing central control for a multi-party conversation, said conference server device comprising:
- detecting means for detecting a scope information, which specifies members of said multi-party conversation, in a received session modifying request; and
- initiating means, responsive to said scope information, for initiating a media modification towards said members specified by said scope information.

Further, the above object is achieved by a computer program product comprising code means for generating the selecting, adding and transmitting steps of the above method when run on a computer device. Moreover, the above object is achieved by a computer program product comprising code means for generating the initiating step of the above method when run on a computer device.

Finally, the above object is achieved by a system for controlling media composition in a multi-party conversation, said system comprising at least one client device as defined above and a conference server device as defined above.

Accordingly, a client or participant can individually control the scope of media modification, i.e. to which members of a multi-party conversation the requested media modification shall be applied. For example, it can be selected by the requesting participant whether the media modification is applied to the whole conference or only between the client and the conference server (i.e. central control point). In this case, one or more media components can be dropped by the requesting client locally or for the whole conference.

According to first aspect, the scope information may be added as a new header parameter of the session modifying request.

According to a second aspect, the scope information may be added as an attribute of the session modifying request. This attribute may for example be an SDP attribute and the scope information may then be added as an a-line value.

In a specific example, the scope may information specify whether the media modification is to be applied to the participant only or to all members of the multi-party conversation.

According to a third aspect, the scope information may be added as a list of addresses of those participants to whom the media modification shall be applied. This list of addresses may comprise, for example, at least one SIP Uniform Resource Indicator (URI).

In the above first to third aspect, the session modifying request may be a SIP re-INVITE or a SIP UPDATE request.

According to a fourth aspect, the session modifying request may identify a recipient which should contact a third party using the scope information. Here, the session modifying request may comprise a header parameter used to inform the central control point that an existing dialog is to be modified, instead of creating a new dialog. As an additional option, the session modifying request may comprise a callee capability information which indicates in which way the existing dialog is to be modified. In the fourth aspect, the scope information may then be added as an address list. This address list may comprise for example at least one SIP URI.

Further advantageous modifications are defined in the dependent claims.

BRIEF DESCRIPTION OF THE DRAWINGS

In the following, the present invention will be described in greater detail based on embodiments with reference to the accompanying drawings in which.

DESCRIPTION OF THE PREFERRED EMBODIMENT

Figure 1:
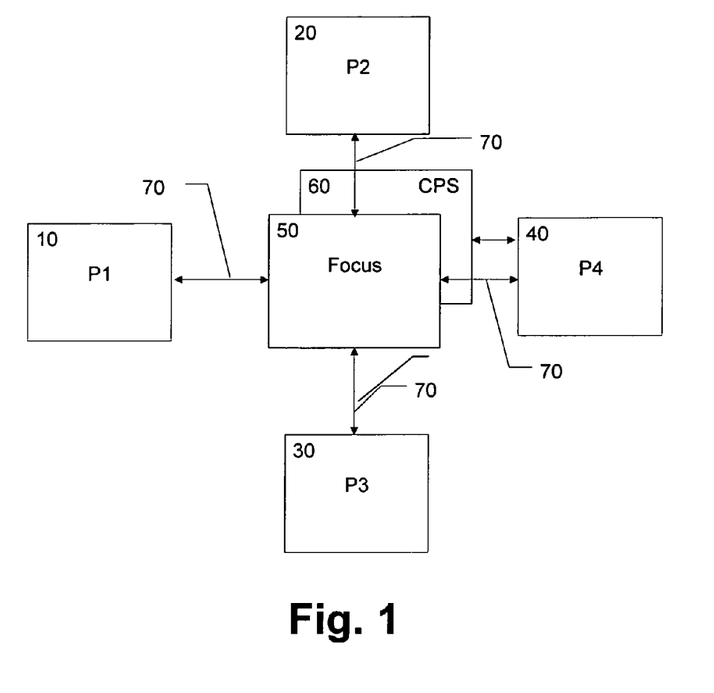
FIG. 1 shows a schematic diagram indicating a multi-party conferencing architecture in which the present invention can be implemented.

The preferred embodiments will now be described on the basis of a SIP multi-party conferencing architecture as shown in FIG. 1.

In this specification, the term "conference" is intended to designate an instance of a multi-party conversation, in which a single control point which may be a SIP user agent, referred to as a focus 50, maintains a dialog via respective call legs 70 with each participant P1 10 to P4 40. Each participant is a software element or routine running on a client computer device or terminal device, that connects a user or apparatus to a conference. It implements, at a minimum, a SIP user agent, but may also implement non-SIP-specific mechanisms for additional functionality. This SIP user agent can be a PC application, a SIP hard-phone, or a PSTN (Public Switched Telephone Network) gateway. It can also be another focus.

The focus 50 plays the role of a centralized manager of the conference, and is addressed by a conference URI, e.g., a URI, usually a SIP URI, which identifies the focus 50 of a conference. The focus 50 is a logical role that maintains a SIP signaling relationship with each participant, e.g., P1 10 to P4 40, in the conference. The focus 50 is responsible for ensuring, in some way, that each participant receives the media that make up the conference. The focus 50 also implements conference policies.

The state of the conference includes the state of the focus 50, the set of participants 10-40 connected to the conference, and the state of their respective dialogs. A conference notification service is provided as a logical function of the focus 50 which can thus act as a notifier, accepting subscriptions to the conference state, and notifying subscribers about changes to that state.

Furthermore, a conference policy server 60 may be provided as a logical function which can store and manipulate the conference policy. This logical function is not specific to SIP, and may not physically exist. It refers to the component that interfaces a protocol to the conference policy which is a complete set of rules governing a particular conference.

Additionally, a mixer (not shown) may be provided which receives a set of media streams of the same type, and combines their media in a type-specific manner, redistributing the result to each participant 10-40.

A conference server is a physical server which contains, at a minimum, the focus functionality. It may also include the conference policy server and mixer functionalities.

As can be gathered from FIG. 1, the central component of the SIP conferencing architecture is the focus 50, which results in a star topology. The focus 50 is responsible for making sure that the media streams which constitute the conference are available to the participants 10-40 in the conference. It does that through the use of one or more mixers, each of which combines a number of input media streams to produce one or more output media streams. The focus 50 uses a media policy to determine the proper configuration of the mixers.

The focus 50 has access to the conference policy of each conference. Effectively, the conference policy can be thought of as a database which describes the way that the conference should operate. It is the responsibility of the focus 50 to enforce those policies. Not only does the focus need read access to the database, but it needs to know when it has changed. Such changes might result in SIP signaling (for example, the ejection of a user from the conference using the SIP BYE method), and those changes with affect the conference state will require a notification to be sent to subscribers using the conference notification service.

Each conference has a unique focus 50 and a unique URI identifying that focus 50. Requests to the conference URI are routed to the focus 50 for that specific conference. Users usually join the conference by sending an INVITE request to the conference URI. As long as the conference policy allows, the INVITE request is accepted by the focus 50 and the user is brought into the conference. Users can leave the conference by sending a BYE message, as they would in a normal call.

Similarly, the focus 50 can terminate a dialog with a participant, should the conference policy change to indicate that the participant is no longer allowed in the conference. The focus 50 can also initiate an INVITE method to bring a participant into the conference.

A participant can communicate with the conference policy server 60 using some kind of non-SIP-specific mechanism by which it can affect the conference policy. This is indicated in FIG. 1 by the arrow between participant P4 40 and the conference policy server 60 which need not be available in any particular conference, although there is always a conference policy.

The interfaces between the focus 50 and the conference policy, and the conference policy server 60 and the conference policy are non-SIP-specific. For the purposes of SIP-based conferencing, they serve as logical roles involved in a conference, as opposed to representing a physical decomposition.

The conference URI is unique, such that no two conferences have the same conference URI. It can be a SIP URI. Contextual information surrounding the URI (for example, SIP header parameters) may indicate that the URI represents a conference. When a SIP request is sent to the conference URI, that request is routed to the focus 50. The conference URI can represent a long-lived conference or interest group, such as "sip:discussion-on-dogs@example.com". The focus identified by this URI would always exist, and always be managing the conference for whatever participants are currently joined. Other conference URIs can represent short-lived conferences, such as an ad-hoc conference. Callee capability parameters are also be used to indicate that the focus 50 supports the conference notification service. This may be achieved by declaring support for the SIP SUBSCRIBE method and the relevant package(s) in the caller preferences feature parameters associated with the conference URI.

As already mentioned and shown in FIG. 1, the focus 50 is the center of the conference. All participants 10-40 in the conference are connected to it by a SIP dialog. The focus 50 is responsible for maintaining the dialogs connected to it. It ensures that the dialogs are connected to a set of participants who are allowed to participate in the conference, as defined by the membership policy. The focus 50 also uses SIP to manipulate the media sessions, in order to make sure each participant obtains all the media for the conference. To do that, the focus 50 makes use of the mixers. Through that interaction, it makes sure that all valid participants 10-40 received a copy of the media streams, and that each participant sends media to an IP address and port on the mixer that cause it to be appropriately mixed with the other media in the conference.

Each conference is composed of a particular set of media that the focus 50 is managing. For example, a conference might contain a video stream and an audio stream. The set of media streams that constitute the conference can be changed by the participants 10-40. When the set of media in the conference change, the focus 50 will need to generate a re-INVITE to each participant in order to add or remove the media stream to each participant. A SIP re-INVITE can be used by a participant to add or remove a media stream. This is accomplished using the standard offer/answer techniques for adding media streams to a session. This will trigger the focus to generate its own re-INVITEs towards the other participants 10-40 of the conference.

Figure 2:
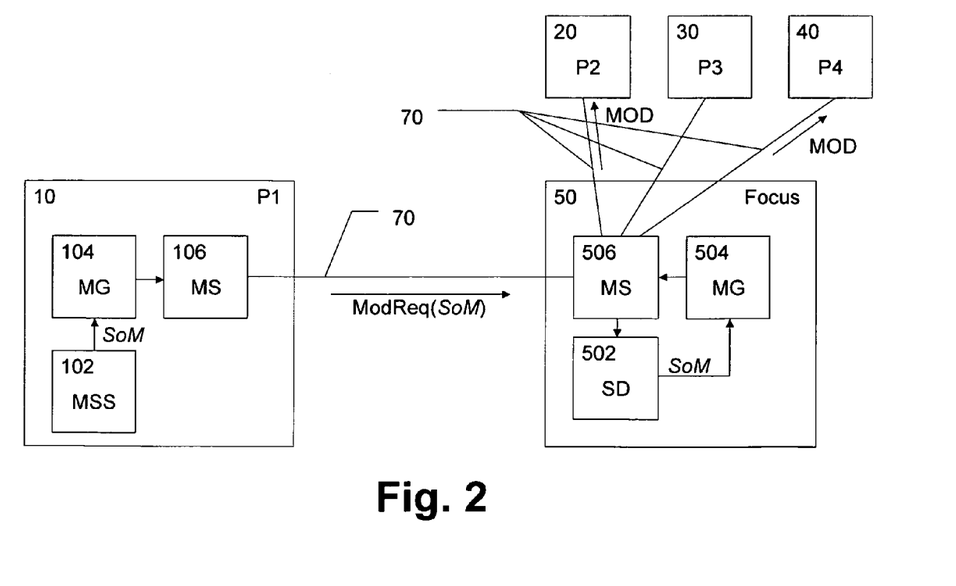
FIG. 2 shows a schematic block diagram of a media modification system according to the preferred embodiments.

FIG. 2 shows a schematic block diagram indicating units or functionalities of a participant 10 or its respective client hardware device and the focus 50 or its respective conference server hardware device, participating at a proposed third party session modification scheme, by means of which media components can be easily manipulated in a flexible manner by the participant 10.

According to FIG. 2, the participant 10 comprises a selection unit or functionality 102 for selecting a scope of a desired media modification, i.e., specific conference participants to which the media modification shall be applied. This selection my be controlled by a software functionality or by a hardware input function provided at the respective client device. In response to such a control or input operation, the selection functionality 102 generates a scope information SoM Scope of Modification) which is added by a message generation unit or functionality 104 to a session modifying request. This request may be any suitable request which can be used to initiate any kind of session modifications. Examples of such request are explained later based on the exemplary SIP conferencing architecture.

The enhanced session modifying request with the added scope information SoM is then signaled or routed to the focus 50 based on the conference URI by a message signaling unit or functionality 106 of the participant 10. At the focus 50, the enhanced session modifying request is received by a similar message signaling unit or functionality 506 and supplied to a scope detection unit or functionality 502 which detects the scope information SoM. The detected scope information SoM is supplied to a message generation unit or function 504 of the focus, the requested media modification is initiated via the message signaling functionality 506 in combination with respective mixer functionalities (not shown) towards those participants specified in the scope information SoM.

It is noted that the above units or functionalities 102, 104, and 106 of the participant 10 and the above units or functionalities 502, 504, and 506 of the focus 50 may be implemented as software routines or components cooperating with or integrated in the respective control programs (e.g. SIP user agents or the like) of the participant 10 and the focus 50, respectively. As an alternative the above listed units or functionalities may be implemented as hardware units of the respective client device or conference server device, respectively. Of course, the above units or functionalities 102, 104, and 106 may be provide in some or all of the other participants 2040, as well.

In the following, different embodiments are described which can be distinguished based on the message type and message portion, which conveys the above scope information SoM.

According to the first to third embodiments re-INVITE or UPDATE requests are modified to provide an easy and flexible way to a participant to selectively modify media compositions of a conference. These mechanisms are used when an existing session is to be modified and participants are not added or removed.

Re-INVITE or UPDATE requests are used to modify medias in the session. The support of the UPDATE method is optional for the network and a participant or client can learn the network capability during session establishment. Although, for reasons of simplicity, the UPDATE method is not always mentioned herein as an alternative method to re-INVITE, it should be understood as an alternative to all use cases of re-INVITE in connection with the first to third embodiments.

As a specific example, it is proposed here that the re-INVITE request contains as the scope information SoM a parameter indicating if the media modification proposed by the client should be applied to the whole session or only to the requesting client. This indication can be conveyed either in the SIP headers or in the SDP payload of the INVITE or UPDATE requests.

In the first embodiment, a new SIP header e.g., Media-Handling (Conference/Client) is introduced. Since one INVITE request can be used for modifying several medias, the SIP header parameter value is applied to all medias negotiated in the re-INVITE. In case some media modification of the re-INVITE request is aimed for the whole conference and some for the participant's own media or call leg only, the participant needs to send a separate re-INVITE request.

As another option for the first embodiment, some already existing SIP header, e.g., the Request-Disposition SIP header could be utilized for conveying the scope information SoM.

In the second embodiment, a SIP URI-list service is proposed for conveying the scope information SoM. In this case, the SIP INVITE/UPDATE request contains the SIP URI-list as request payload. The SIP URI-list is used to tell to which participants the media modification should be applied. The SIP URI-list can also contain the conference URI indicating that media modifications are applied to all conference participants. Similar to the first embodiment, by default, all proposed media modifications (multiple m-lines in FIG. 3) are applied to participants given in SIP URI-list. If the participant wants to add some media to the whole conference, but other media only for a subset of participants, two separate re-INVITEs/UPDATES are needed.

In addition to SIP URI-list as specified in "draft-ieff-sip-ping-uri-services-05.txt", some additional indication might be needed in the re-INVITE/UPDATE request to inform the focus 50 how it should use the SIP URI-list information. The SIP URI-list might already be included in the re-INVITE/UPDATE request for some other reasons. Therefore, combinations of proposed mechanisms are possible, such as SIP URI-list and SIP header, SIP URI-list and SDP attribute, or additionally SIP URI-list itself could contain new field indicating that this list is used for this particular purpose.

Figure 3:
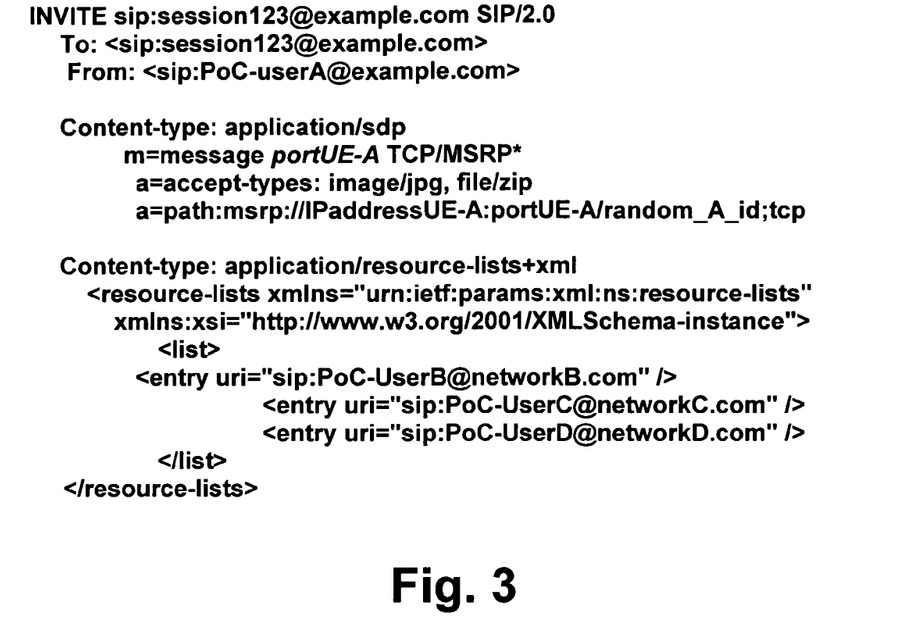
FIG. 3 shows a listing of example of a re-INVITE request as used in a second embodiment.

FIG. 3 shows an exemplary listing of a re-INVITE request according to the second embodiment, which contains two bodies, SDP and SIP URI-list for a PoC service.

In the third preferred embodiment, a new SDP attribute e.g., Conference/Client-only or media-treatment:Conference/Client-only, is introduced for conveying the scope information SoM, e.g., as an a-line value.

Figure 4:
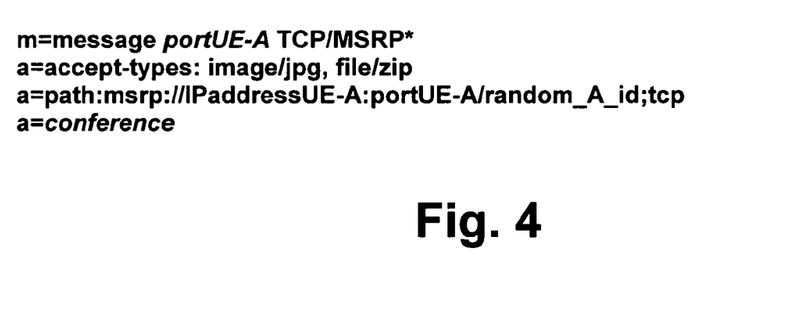
FIG. 4 shows a listing of an example of an SDP attribute as used in a third embodiment.

FIG. 4 shows a listing of an example of the proposed SDP attribute. In this case new a-line value "conference" indicates that this media modification applies for the whole conference and a new value "client-only", indicates that the media modification shall be applied only between this particular requesting participant and the conference server.

This new SDP attribute is more flexible, since the participant can include several medias into the same re-INVITE and request different handling for each of the medias. The conference server, i.e. the focus 50, can negotiate own leg modifications immediately, while new media for the whole conference may take some time.

According to the fourth embodiment, the REFER method as specified in IETF RFC 3515 is used as session modifying request, to which the scope information is added.

In particular, a new SIP header "Alternates" could be introduced (as compared to "Replaces"). This header is used in the SIP REFER method to notify the referee, i.e. the focus 50, that the INVITE sent due to the reception of the REFER is supposed to modify the existing dialog, instead of creating a new dialog. In addition, the callee capabilities could be used along the contact URI in the Refer-to header in the REFER method. These callee capabilities together with the new Alternates header indicate to the focus 50 in what way the dialog should be modified.

As an additional option, the SIP URI list service could be used for REFER to generate the re-INVITE to all participants 10-40 of the conference session. With the SIP URI list service, it is also possible to request that re-INVITE is generated and sent to only some of conference participants. In this case, the requesting participant or client can include the list of participants into the REFER request as SIP-URI list.

This new REFER based mechanism utilizing the Alternates header can be used always when the participant wants to modify the sessions of other participants. If the participant wants to modify its own call leg 70 to the focus 50, it uses the regular SDP offer/answer mechanism as explained in the third preferred embodiment.

Figure 5:
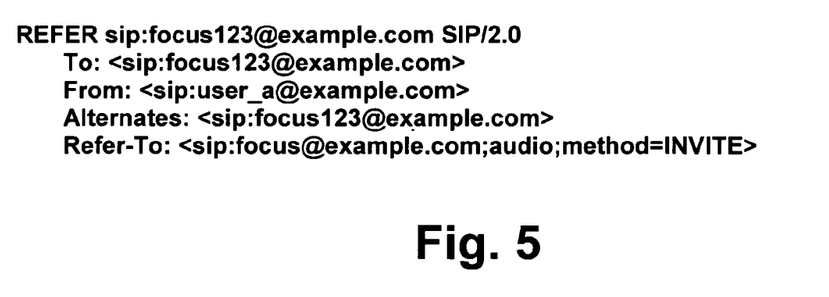
FIG. 5 shows a listing of an example of a REFER request as used in a first example of a fourth embodiment.

FIG. 5 shows a listing of a first example of a REFER request according to the fourth embodiment, where user A wants to drop video from all participants in the audio/video multimedia conferencing session. User A sends a REFER request to the focus 50. The REFER request contains a Refer-to header with the focus URI. The focus URI in the Refer-to indicates that the method should be sent to all participants currently in the session with this focus 50.

The focus 50 then generates a re-INVITE to each participant currently in the session. Additionally, the focus 50 adds an SDP offer to the re-INVITE based on the currently negotiated media in each participant's session. Based on the callee capabilities (audio in this example) given in the Refer-To header of the REFER request, the focus 50 generates an SDP offer that includes only the audio media. As a response from each participant, the video is dropped from all participants.

Another way to drop the video in a second example of the fourth embodiment is to send a nested REFER to the focus.

Figure 6:
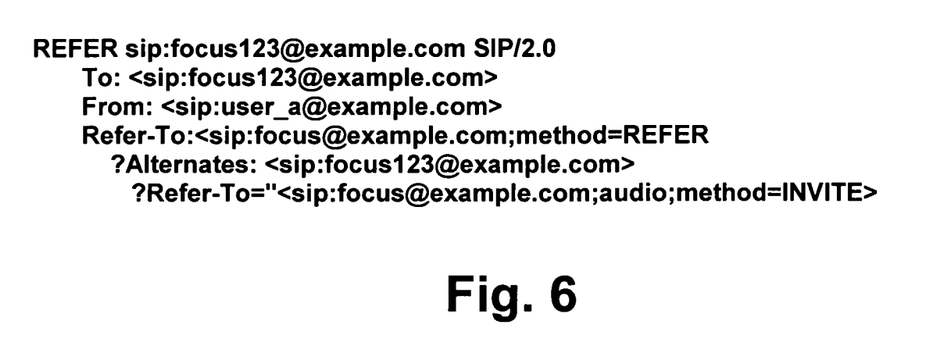
FIG. 6 shows a listing of an example of a nested REFER request as used in a second example of the fourth embodiment.

FIG. 6 shows a listing of the REFER request according to the second example. The nested focus generates a REFER to each participant. This second REFER includes the new Alternates header, based on that the participant generates a re-INVITE back to the focus. This re-INVITE includes an SDP offer that drops the video media from the ongoing dialog.

As a specific example, the simple and flexible media modification mechanisms introduced above in connection with the first to fourth embodiments can be implemented in OMA PoC 2.0. Thereby, a new media for a PoC feature is provided, in which one session can contain several medias.

In summary, a method, system, client device, conference server device and computer program product for controlling media composition in a multi-party conversation involving a central control point have been described. At a participant of said multi-party conversation, a scope information which specifies members of said multi-party conversation is selected and added to a session modifying request. The session modifying request is transmitted to the central control point which initiates a media modification at the specified members in response to the scope information. Thereby, a client can control whether media modification is applied to the whole conference, selected participants or only between the client itself and the conference server.

It is noted that the present invention is not restricted to the above preferred SIP-based embodiments, but can be applied in connection with any type of media modification for multi-party conversations, where session modifying requests can be used for modifying media components. Any header or payload portion or parameter can be used or newly introduced to add and convey the proposed scope information. The preferred embodiments may thus vary within the scope of the attached claims.

The invention claimed is:

1. A method comprising:
selecting, by a participant at a client device of the participant currently in a multi-party conversation session, scope information that specifies one or more members currently in the multi-party conversation session for whom a modification of a media type received by the one or more participants from a central point is to be applied;
generating, by the client device, a session modifying request based on the selected scope information; and
determining, by the client device, to transmit from the client device, said session modifying request to a central control point to apply the media type modification specified by said selected scope.

2. A method according to claim 1, wherein said selected scope information is a header parameter or an attribute of said session modifying request.

3. A method according to claim 1, wherein the media type modification involves media types including push to talk over cellular (PoC) audio, instant messaging, full-duplex audio, full-duplex video, or a combination thereof.

4. A method according to claim 1, wherein said selected scope information is specified within said session modifying request as a session description protocol (SDP) attribute.

5. A method according to claim 2, wherein said selected scope information is specified within said session modifying request as an a-line value.

6. A method according to claim 1, wherein said media type modification is applied only between said participant and the central control point without affecting other participants of said multi-party conversation session, when the media type modification is selected to be applied only to the participant.

7. A method according to claim 1, comprising adding a list of addresses of all participants to whom said media type modification shall be applied.

8. A method according to claim 7, wherein said list of addresses includes a session initiation protocol (SIP) uniform resource indicator (URI) list.

9. A method according to claim 7, wherein said list of addresses includes at least one uniform resource indicator (URI) of the session initiation protocol (SIP).

10. A method according to claim 1, wherein said session modifying request is a re-INVITE request of the session initiation protocol (SIP).

11. A method according to claim 1, wherein said session modifying request identifies a recipient which should contact a third party using said scope information.

12. A method according to claim 11, wherein said session modifying request includes a header parameter used to inform said central control point that an existing dialog is to be modified, instead of creating a new dialog.

13. A method according to claim 12, wherein said session modifying request includes a callee capability information which indicates in which way said existing dialog is to be modified.

14. A method according to claim 11, wherein said selected scope information is added as an address list.

15. A method according to claim 14, wherein said address list comprises at least one uniform resource indicator (URI) of a session initiation protocol (SIP).

16. An apparatus comprising:
at least one processor; and
at least one memory including computer program code,
wherein the at least one memory and the computer program code are configured to, with the at least one processor, cause the apparatus to perform at least the following:
select, by a participant at the apparatus, currently in a multi-party conversation session, scope information that specifies one or more members currently in the multi-party conversation session for whom a modification of a media type received by the one or more members, from a central point, is to be applied; generate, by the apparatus, a session modifying request based on the selected scope information; and
determine, by the apparatus, said session modification request and transmit said session modifying request to the central control point to apply the media type modification specified by said selected scope information.

17. An apparatus according to claim 16, wherein said selected scope information is a header parameter or a message attribute of said session modifying request.

18. An apparatus according to claim 16, wherein the media type modification involves media types including push to talk over cellular (PoC) audio, instant messaging, full-duplex audio, full-duplex video, or a combination thereof.

19. An apparatus according to claim 17, wherein said message attribute is a session initiation protocol (SIP) attribute, and said selected scope information is added as an a-line value.

20. An apparatus according to claim 16, wherein said media type modification is applied only between the participant and the central control point during said multi-party conversation session without affecting other participants of said multi-party conversation session, when the media type modification is selected to be applied only to the participant.

21. An apparatus according to claim 16, wherein said selected scope information is added as a list of addresses of those participants to whom said media type modification shall be applied.

22. An apparatus according to claim 21, wherein said list of addresses comprises at least one uniform resource indicator (URI) of the session initiation protocol (SIP).

23. An apparatus according to claim 16, wherein said session modifying request is a re-INVITE or UPDATE request of the session initiation protocol (SIP).

24. An apparatus according to claim 16, wherein said session modifying request identifies a recipient which should contact a third party using said selected scope information.

25. An apparatus according to claim 24, wherein said session modifying request includes a header parameter used to inform said central control point that an existing dialog is to be modified, instead of creating a new dialog.

26. An apparatus according to claim 25, wherein said session modifying request includes a callee capability information which indicates how said existing dialog is to be modified.

27. An apparatus according to claim 24, wherein said selected scope information comprises an address list.

28. An apparatus according to claim 27, wherein said address list comprises at least one uniform resource indicator (URI) of a session initiation protocol (SIP).

29. An apparatus comprising:
at least one processor; and
at least one memory including computer program code,
wherein the at least one memory and the computer program code are configured to, with the at least one processor, cause the apparatus to perform at least the following, receive media type modification scope information in a session modifying request, which is selected by a participant at a client device while the participant is currently in a multi-party conversation session, to apply a media type modification to one or more members currently in the multi-party conversation session for whom the media type modification is to be applied;

detect, at the conference server, media type modification scope information generated by the client device; and apply, at the conference server, the media type modification specified by said detected scope information.

30. An apparatus according to claim 29, wherein said scope information is detected in a header or a message attribute of said session modifying request.

31. An apparatus according to claim 29, wherein the media type modification involves media types including push to talk over cellular (PoC) audio, instant messaging, full-duplex audio, full-duplex video, or a combination thereof.

32. An apparatus according to claim 30, wherein said message attribute is a session initiation protocol (SIP) attribute, and said scope information is detected as an a-line value.

33. An apparatus according to claim 29, wherein said media type modification is applied only between the participant and the apparatus during said multi-party conversation session without affecting other participants of said multi-party conversation session, when the media type modification is selected to be applied only to the participant.

34. An apparatus according to claim 29, wherein said scope information is detected as a list of addresses of those participants to whom said media type modification shall be applied.

35. An apparatus according to claim 34, wherein said list of addresses includes at least one uniform resource indicator (URI) of the session initiation protocol (SIP).

36. An apparatus according to claim 29, wherein said session modifying request is a re-INVITE or UPDATE request of a session initiation protocol (SIP).

37. An apparatus according to claim 29, wherein said session modifying request identifies a recipient which should contact a third party using said detected scope information.

38. An apparatus according to claim 37, wherein in said session modifying request, a header parameter used to inform said conference server device that an existing dialog is to be modified instead of creating a new dialog, is detected.

39. An apparatus according to claim 38, wherein in said session modifying request, a callee capability information, which indicates in which way said existing dialog is to be modified, is detected.

40. An apparatus according to claim 37, wherein said detected scope information includes an address list.

41. An apparatus according to claim 40, wherein said address list includes at least one uniform resource indicator (URI) of a session initiation protocol (SIP).

42. A non-transitory computer-readable storage medium carrying one or more sequences of one or more instructions which, when executed by one or more processors, cause an apparatus to perform at least the following: selecting, by a participant at the apparatus while the participant is currently in a multi-party conversation session, scope information that specifies one or more members currently in the multi-party conversation session for whom a modification of a media type received by the one or more members is to be applied; generating, by the apparatus, a session modifying request based on the selected scope information; and determining, by the apparatus, to transmit said session modifying request to the central control point to apply the media type modification specified by said selected scope information.

43. A computer-readable storage medium according to claim 42, wherein the apparatus is caused to further perform: providing a user agent for a client device.

44. A computer-readable storage medium according to claim 42, wherein the apparatus is caused to further perform: providing a user agent for a conference server device.

45. A system, said system comprising:
a conference server including:
at least one processor; and
at least one memory including computer program code, wherein the at least one memory and the computer program code configured to, with the at least one processor, cause the conference server to perform at least the following:
receive scope information in a received session modifying request, which is selected by a participant at a client device while the participant is currently in a multi-party conversation session, to specify one or more members currently in the multi-party conversation session for whom the received session modification request it to be applied; and
apply the media type modification specified by said detected scope information by the client device.

46. A method comprising:
receiving in a session modifying request, scope information, that is selected by a participant using a client device and the participant is currently in a multi-party conversation session, to apply a media type modification for one or more members currently in the multi-party conversation session for whom the media type modification applies; and
determining to apply the media type modification specified by said detected scope information.

47. A non-transitory computer-readable storage medium carrying one or more sequences of one or more instructions which, when executed by one or more processors, cause an apparatus to perform at least the following: receiving in a session modifying request, media type modification scope information selected by a participant at the apparatus and the participant is currently in a multi-party conversation session, to apply a media type modification to one or more members currently in the multi-party conversation session for whom the media type modification applies; and applying, at the conference server, the media type modification specified by said detected scope information.

48. The method of claim 1, wherein said client device comprises selection, generation and determination units sequentially configured in corresponding to said selecting, generating and determining steps.

49. The apparatus of claim 16, wherein said apparatus of the participant comprises selection, generation and determination units sequentially configured in corresponding to said select, generate and determine steps.

50. The apparatus of claim 29, wherein said conference server comprises reception, detection and application units sequentially configured in corresponding to said receive, detect and apply steps.

51. The computer-readable storage medium of claim 42, wherein said apparatus of the participant comprises selection, generation and determination units sequentially configured in corresponding to said selecting, generating and determining steps.

52. The system of claim 45, wherein said conference server comprises reception and application units sequentially configured in corresponding to said receive and apply steps.

53. The method of claim 46, wherein said apparatus of the participant comprises reception and determination units sequentially configured in corresponding to said receiving and determining steps.

54. The computer-readable storage medium of claim 47, wherein said conference server comprises reception and application units sequentially configured in corresponding to said receiving and applying steps.

\* \* \* \* \*